(12) United States Patent
Gullickson et al.

(10) Patent No.: US 7,620,176 B2
(45) Date of Patent: Nov. 17, 2009

(54) ADJUSTABLE VIEW STAND

(75) Inventors: Mark Solon Kanjitsu Gullickson, Santa Monica, CA (US); Naoki Shimada, Torrance, CA (US); Erik Raymond Chin, Hermosa Beach, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 11/460,058

(22) Filed: Jul. 26, 2006

(65) Prior Publication Data

US 2008/0037767 A1   Feb. 14, 2008

(51) Int. Cl.
*H04M 1/00* (2006.01)
*H04M 9/00* (2006.01)

(52) U.S. Cl. ...................... 379/455; 379/446; 455/575.1
(58) Field of Classification Search ............ 379/433.01, 379/433.02, 433.04, 435, 446, 449, 454, 379/455; 455/575.1
See application file for complete search history.

(56) References Cited

U.S. PATENT DOCUMENTS 6,278,779 B1 *   8/2001   Bryant et al. ............... 379/449

* cited by examiner

*Primary Examiner*—Tuan D Nguyen

(57) ABSTRACT

A stand for a handset having a display is provided. The stand consists of a fixed portion and an adjustable portion coupled to the fixed portion. The adjustable portion is operable to receive the handset and operable for adjustment of a viewing angle of the handset.

18 Claims, 4 Drawing Sheets

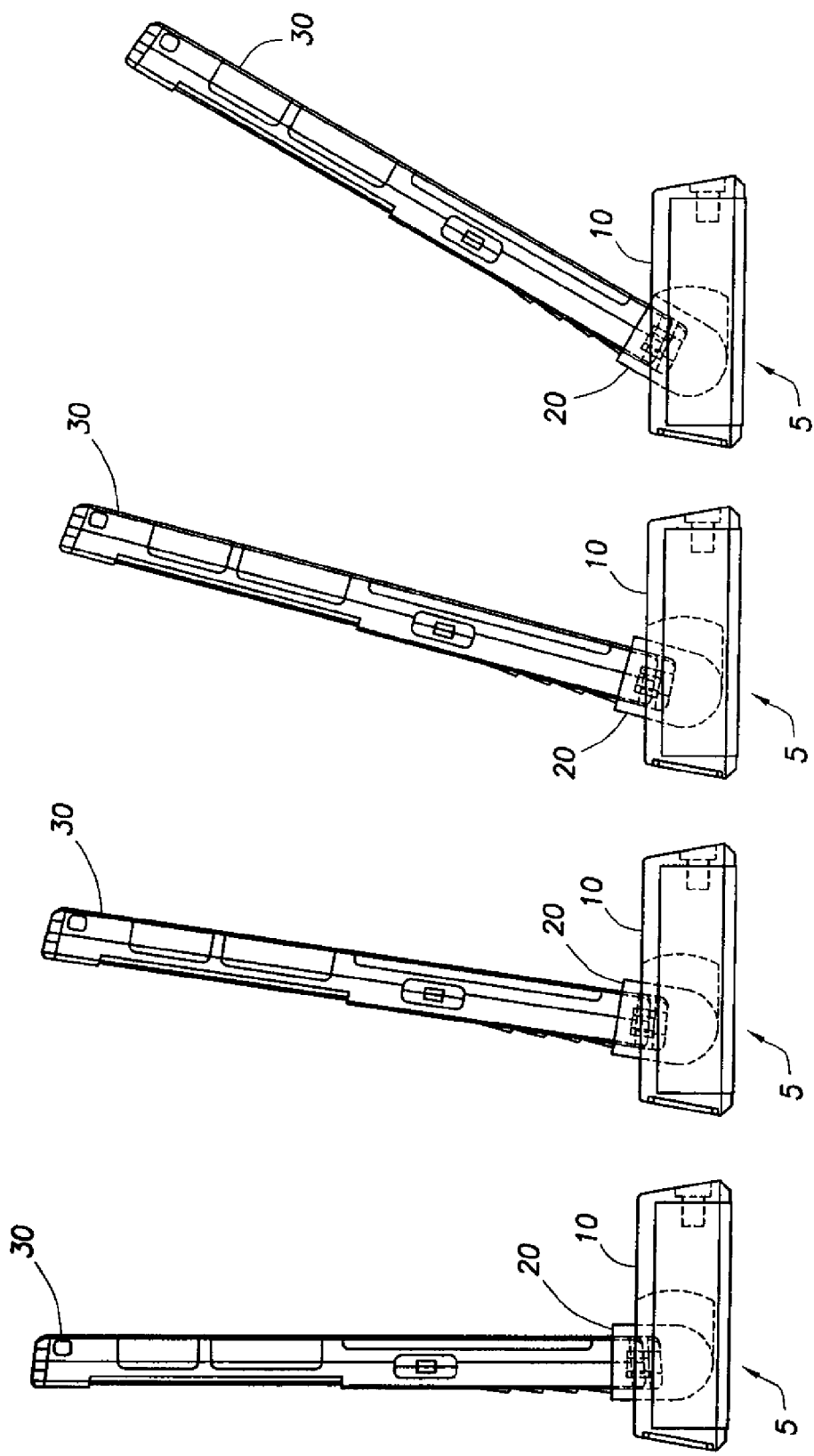

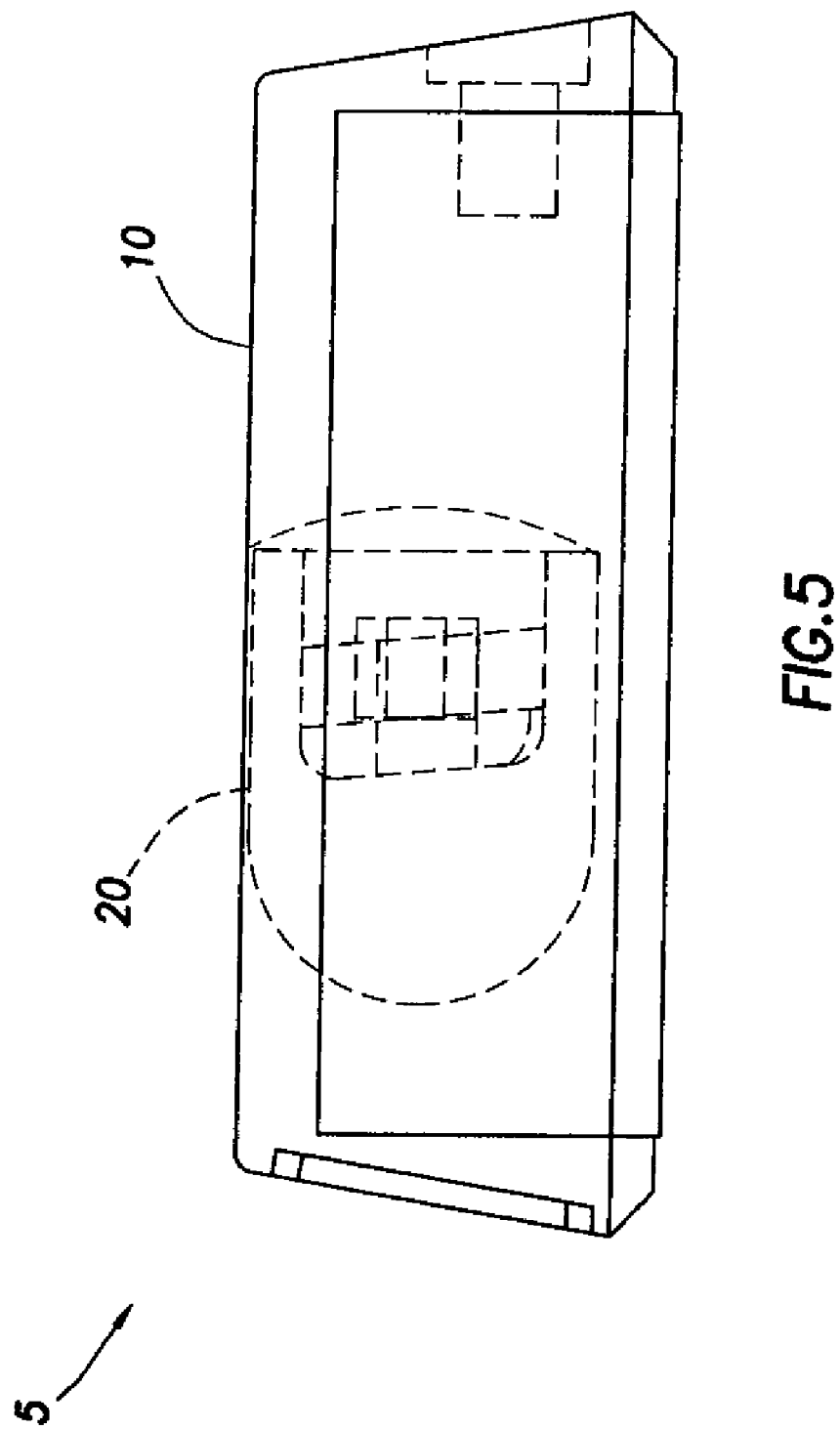

US 7,620,176 B2

ADJUSTABLE VIEW STAND

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

BACKGROUND

Handheld electronic devices or handsets such as portable streaming video players, mobile telephones, personal digital assistants, handheld computers, portable music players, calculators, and similar devices will be referred to herein as handsets. Many handsets include a display screen on which a user can watch videos, read text, or gain access to other information presented in a visual medium. The user typically holds the handset in his or her hand while viewing the display screen.

SUMMARY

In one embodiment, a stand for a handset having a display is provided. The stand consists of a fixed portion and an adjustable portion coupled to the fixed portion. The adjustable portion is operable to receive the handset and operable for adjustment of a viewing angle of the handset.

In another embodiment, a handset accessory is provided. The handset accessory consists of a base and a cradle. The cradle is coupled to the base and is operable to receive the handset. The cradle is also operable to adjust a disposition of the handset when the handset is provided in the cradle.

In another embodiment, a method for viewing video information is provided. The method consists of providing a handset that includes a screen operable to display the video information. The method also consists of providing a base, where the base includes an adjustable cradle operable to receive the handset. The method also includes placing the handset in the cradle and adjusting a viewing angle of the handset for viewing the video information while the handset is provided in the cradle.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 4a, 4b, 4c, and 4d illustrate the view stand cradle adjusted to different angles according to an embodiment of the disclosure.

FIG. 5 is a diagram of the view stand cradle rotated into the interior of the adjustable portion of the view stand according to an embodiment of the disclosure.

DETAILED DESCRIPTION

It should be understood at the outset that although an illustrative implementation of at least one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

When holding a handset to view a movie or some other video-based content, a user might need to maintain his or her hand in an awkward position to achieve a suitable viewing angle for the handset. Holding a handset for an extended period of time can become tiresome. If the user chooses to rest the handset on a horizontal surface, such as a desk or tabletop, the resulting viewing angle may not be conductive to viewing or may not provide a high quality picture. If the user chooses to lean the handset against an object to achieve a proper viewing angle, the handset might be likely to slip or fall.

In embodiments of the present disclosure, a stand is provided that can hold a handset in adjustable positions on a table, desk, or similar surface. The stand includes a cradle into which the handset can be inserted and which can be adjusted to allow the handset to be viewed at different angles. In this way, the viewing angle can easily be adjusted to suit the preferences of the user for comfort and picture quality. The handset can then be securely held in the selected position.

Figure 1:
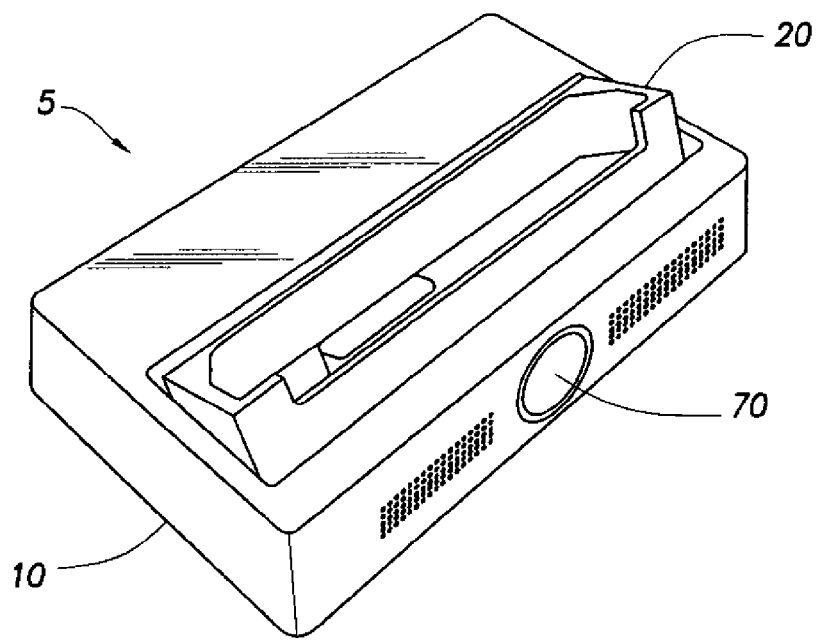
FIG. 1 is a diagram of an adjustable view stand according to an embodiment of the disclosure.
Figure 2:
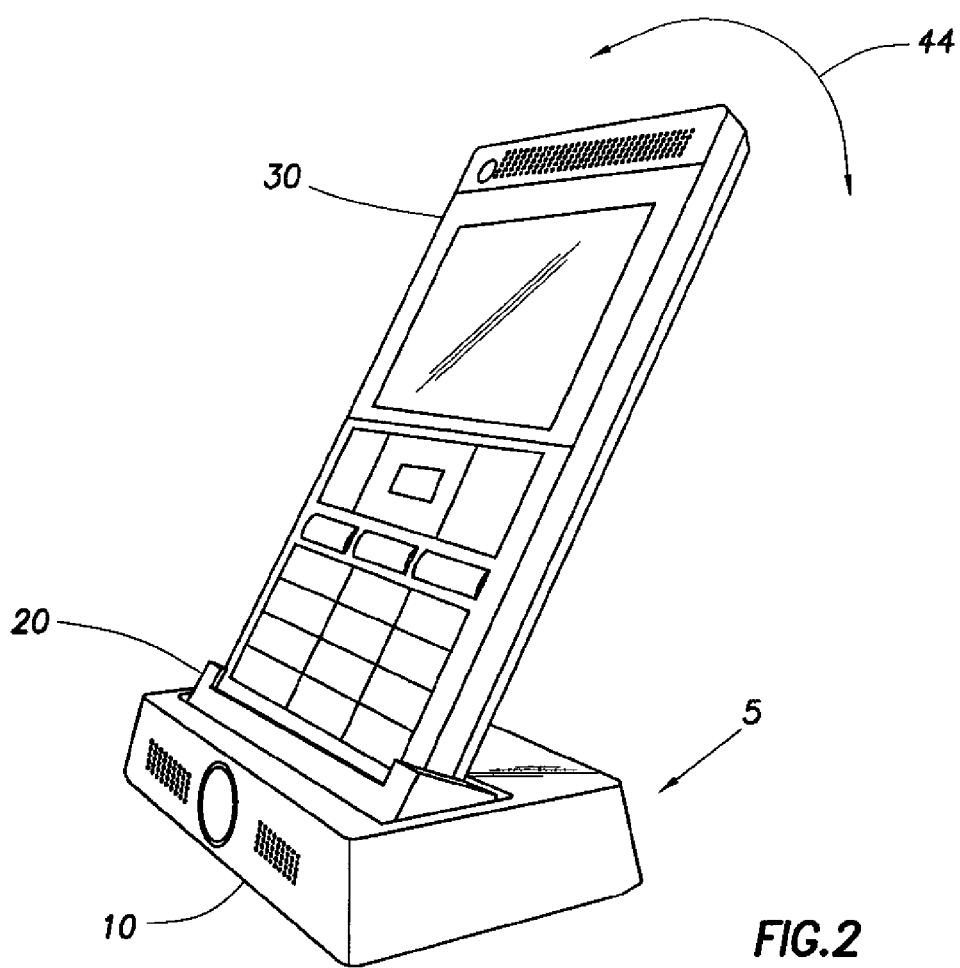
FIG. 2 is a diagram of a handset inserted into the adjustable view stand shown in FIG. 1.

FIG. 1 illustrates an embodiment of such a stand 5. The stand 5 includes a fixed portion 10, or base, with a bottom surface that is substantially flat so that the stand 5 can be placed securely on a flat surface such as a desktop or tabletop. The stand 5 also includes an adjustable portion 20 that can hold a handset. FIG. 2 illustrates a handset 30 that has been placed in the adjustable portion 20 of the stand 5.

Figure 3:
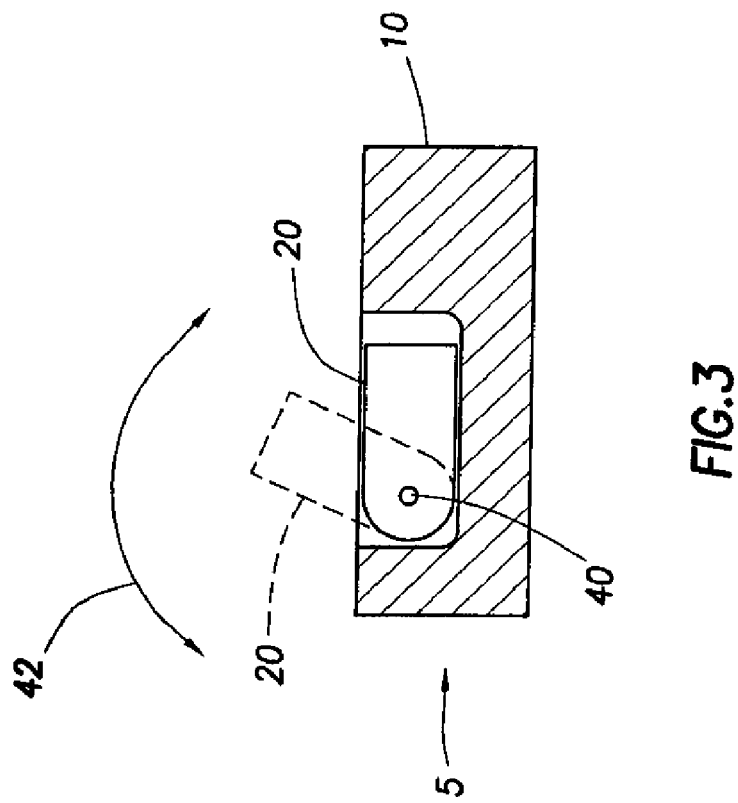
FIG. 3 is a diagram of a mechanism that can allow a view stand cradle to rotate through a range of angles according to an embodiment of the disclosure.

In an embodiment, the adjustable portion 20, or cradle, is capable of swiveling so that the handset 30 can be viewed at different angles. FIG. 3 illustrates a mechanism 40 that can allow the cradle 20 to rotate through a range of angles. The mechanism 40 might be a hinge, an axle, a ball joint, or some other well-known apparatus for providing rotational motion. The mechanism 40 might allow rotation through a single axis or through multiple axes of rotation. For example, the handset 30 might rotate "backwards/forwards" about a horizontal axis 42 as shown in FIG. 3 and might also rotate "left/right" about a vertical axis 44 as shown in FIG. 2.

Regardless of the precise nature of the mechanism 40, the mechanism 40 can be provided with a means for holding the cradle 20 securely at a desired angle. For example, the mechanism 40 might be a friction hinge that holds the cradle 20 in a particular disposition by friction or might be a ratchet hinge that holds the cradle 20 in a particular disposition by a ratcheting action. One of skill in the art will recognize other ways in which the cradle 20 could be prevented from rotating away from the desired angle by the force of gravity pulling downward on the handset 30.

In an embodiment, the stand 5 can be provided with sufficient weight to counterbalance the weight of the handset 30 when the handset 30 is inserted into the stand 5 at the different possible angles. This can prevent the force of gravity from toppling the stand 5 when the handset 30 is inserted into the stand 5 at angles far from the vertical.

FIGS. 4a, 4b, 4c, and 4d illustrate various angles at which the handset 30 could be positioned. One of these angles might provide a user of a portable streaming video player, for example, a comfortable viewing angle for watching a movie, a streaming video broadcast, or some other video content. A particular angle might also reduce glare to a minimum. If the user wished to change the viewing angle, the user could simply swivel the handset 30 forward or backward and the cradle 20 would hold the handset 30 in the desired position.

It can be seen in FIG. 5 that the cradle 20 can rotate in such a manner that the cradle 20 does not substantially protrude from the fixed portion 10. That is, the fixed portion 10 might include an opening of such a size and shape that, when the cradle 20 is rotated to an appropriate angle, the cradle 20 is substantially contained within the interior of the fixed portion 10. This can make the stand 5 more compact and more portable and can reduce the likelihood of the cradle 20 being exposed to damage when the stand 5 is being carried or transported. When the cradle 20 is in this storage mode, it may not be possible to insert the handset 30 into the cradle 20.

In one embodiment, the stand 5 is manufactured to be used with a particular brand, type, or model of handset 30 and the cradle 20 has a fixed size appropriate for the handset 30 for which the stand 5 was made. In an alternative embodiment, the size and shape of the cradle 20 may be adjustable to accommodate different sizes and shapes of handsets 30. For example, the cradle 20 might contain moveable sides or a similar mechanism to hold different shapes and sizes of handsets 30 in the cradle 20. Alternatively, the cradle 20 might contain an insert of foam or similar material that can conform to different shapes and sizes of handsets 30 and thus hold the handset 30 in place. In still other embodiments, other techniques or configuration may be used to retain handsets of varying sizes, which will readily suggest themselves to one skilled in the art in view of the present teachings.

Figure 6:
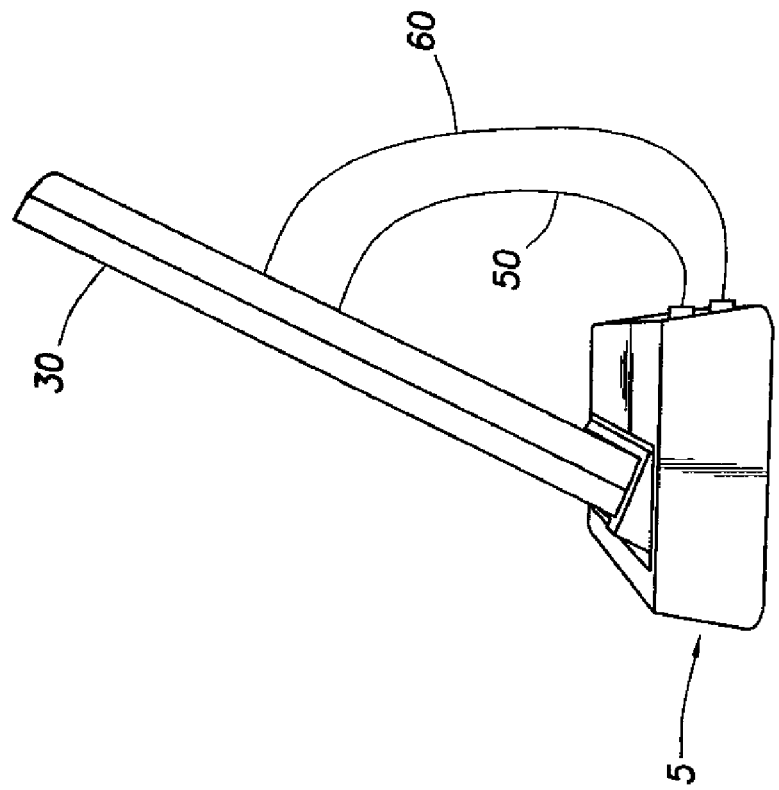
FIG. 6 is a diagram of a charging cable and a speaker cable connecting a handset to the adjustable view stand according to an embodiment of the disclosure.

In an embodiment, the stand 5 includes a component for providing an electrical charge to the handset 30. This is illustrated in FIG. 6, where a charging cable 50 connects the handset 30 to the stand 5. Electricity can flow from the stand 5 to the handset 30 through the charging cable 50 to charge a battery in the handset 30. While the charging cable 50 is shown in FIG. 6 connecting the rear portion of the handset 30 to the rear portion of the stand 5, in other embodiments the charging cable 50 can connect the handset 30 and the stand 5 in other locations. Also, the charging connection may be a more direct connection than the connection via the cable 50. For example, the handset 30 might have a charging port on its bottom surface and the cradle 20 might have a charging port on its upper surface such that, when the handset 30 is placed in the cradle 20, the charging port on the handset 30 connects to the charging port on the cradle 20.

In an embodiment, the stand 5 includes at least one speaker that can play sounds generated by the handset 30. A speaker cable 60 might connect an audio output port on the handset 30 to an audio input port on the stand 5. When the speaker cable 60 is connected, sounds that would otherwise come from a speaker on the handset 30 might instead come from the speaker or speakers on the stand 5. Alternatively, sounds might be emitted simultaneously by both the speaker on the handset 30 and the speaker or speakers on the stand 5. In an alternative embodiment, the handset 30 might have an audio output port on its bottom surface and the cradle 20 might have an audio input port on its upper surface such that, when the handset 30 is placed in the cradle 20, the audio output port on the handset 30 connects to the audio input port on the cradle 20. FIG. 1 shows a single speaker 70 on the front portion of the stand 5, but in other embodiments two or more speakers 70 might be present to provide stereo sound. Also, the speaker 70 or speakers 70 might be located in other positions on the stand 5 or might be external to and attachable to the stand 5.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A stand for a handset having a display, the handset comprising: a fixed portion; and an adjustable portion coupled to the fixed portion and operable to receive the handset and operable when the handset is provided in the adjustable portion for adjustment of a viewing angle of the handset, wherein the adjustable portion is positioned at least partially within the fixed portion, wherein the handset is supported by inserting at least part of the handset into the adjustable portion, and wherein the handset is supported and the viewing angle adjusted using the same part of the stand and wherein the fixed portion includes at least one speaker operable to emit a sound based on a signal generated by the handset.

2. The stand of claim 1, wherein the adjustable portion is operable to be disposed at a plurality of angles by at least one of:

a friction hinge;
 a ratchet hinge;
 an axle; and
 a ball joint.

3. The stand of claim 2, wherein the adjustable portion is operably adjustable about one or more axes of rotation.

4. The stand of claim 2, wherein the adjustable portion is operable to accommodate a plurality of handsets having a plurality of shapes and sizes.

5. The stand of claim 2, wherein at least one of the fixed portion and the adjustable portion is operable to promote providing an electrical charge to the handset.

6. The stand of claim 2, further comprising the handset and wherein the handset includes a screen operable to display video information.

7. The stand of claim 2, wherein the adjustable portion is operable to receive at least one handset selected from a group of handsets consisting of:
- a device operable to display streaming video content;
- a mobile telephone;
- a video player
- a personal digital assistant;
- a handheld computer;
- a music player; and
- a calculator.

8. A handset accessory comprising:
- a base; and a cradle coupled to the base and operable to receive the handset, the cradle operable to adjust a disposition of the handset when the handset is provided in the cradle, wherein the cradle is positioned at least partially within the base, and wherein the cradle supports the entire handset and wherein the base includes at least one sneaker operable to emit a sound based on a signal generated by the handset.

9. The handset accessory of claim 8, wherein the cradle is operable to be disposed at a plurality of angles by at least one of:
- a friction hinge;
- a ratchet hinge;
- an axle; and
- a ball joint.

10. The handset accessory of claim 8, wherein the cradle is adjustable to retain a first handset having a first size and a second handset having a second size, the first size different from the second size.

11. The handset accessory of claim 8, wherein the cradle is operable to accommodate a plurality of handsets having different sizes.

12. The handset accessory of claim 8, further comprising a component for providing an electrical charge to the handset when the handset is coupled to the cradle.

13. The handset accessory of claim 8, further comprising the handset and wherein the handset includes a screen operable to display visually perceptible information.

14. The handset accessory of claim 8, wherein the adjustable portion is operable to receive at least one handset selected from a group of handsets consisting of:
- a device operable to display streaming video content;
- a mobile telephone;
- a personal digital assistant;
- a handheld computer;
- a music player; and
- a calculator.

15. A method for viewing video information comprising: providing a handset that includes a screen operable to display the video information; providing a base, the base including an adjustable cradle operable to receive the handset; placing the handset in the cradle, wherein at least part of the cradle is positioned within a cavity in the base, and wherein the cradle supports the entire handset; wherein the base includes at least one speaker operable to emit a sound based on a signal generated by the handset and adjusting a viewing angle of the handset for viewing the video information while handset is provided in the cradle.

16. The method of claim 15, wherein the cradle is operable to be disposed at a plurality of angles by means of at least one of:
- a friction hinge;
- a ratchet hinge;
- an axle; and
- a ball joint.

17. The method of claim 15, further comprising removing the handset from the cradle, and providing the cradle in a storage mode, the storage mode inoperable for receiving the handset.

18. The method of claim 15, further comprising charging the handset while the handset is provide in the cradle.

* * * * *

UNITED STATES PATENT AND TRADEMARK OFFICE
CERTIFICATE OF CORRECTION

PATENT NO. : 7,620,176 B2
APPLICATION NO. : 11/460058
DATED : November 17, 2009
INVENTOR(S) : Mark Solon Kanjitsu Gullickson, Naoki Shimada and Erik Raymond Chin It is certified that error appears in the above-identified patent and that said Letters Patent is hereby corrected as shown below:

Column 5, claim 8, line 21, delete "sneaker" and replace with --speaker--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,620,176 B2
APPLICATION NO. : 11/460058
DATED : November 17, 2009
INVENTOR(S) : Gullickson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this

Fourteenth Day of December, 2010

David J. Kappos
*Director of the United States Patent and Trademark Office*